United States Patent [19]
Orthman

[11] 3,870,108
[45] Mar. 11, 1975

[54] SEEDBED SPLITTER AND SHAPER
[75] Inventor: Henry Orthman, Lexinton, Nebr.
[73] Assignee: Orthman Manufacturing, Inc., Lexington, Nebr.
[22] Filed: Oct. 3, 1973
[21] Appl. No.: 403,285

[52] U.S. Cl................. 172/722, 172/159, 172/736
[51] Int. Cl........................................... A01b 39/20
[58] Field of Search................. 172/159, 722–726, 172/736, 739; 37/98

[56] References Cited
UNITED STATES PATENTS

| 316,403 | 4/1885 | Schroeder.................... 172/722 X |
| 1,491,168 | 4/1924 | Prendergast........................... 37/98 |
| 1,956,445 | 4/1934 | Knobel.................................. 37/98 |
| 2,453,723 | 11/1948 | Palmer et al.......................... 37/98 |
| 2,673,511 | 3/1954 | Roberts............................. 172/722 |
| 2,684,543 | 7/1954 | Cundiff................................ 37/98 |
| 3,191,690 | 6/1965 | Hill.................................. 172/722 |
| 3,718,103 | 2/1973 | Orthman........................... 37/98 X |

Primary Examiner—Edgar S. Burr
Assistant Examiner—Paul T. Sewell
Attorney, Agent, or Firm—Zarley, McKee, Thomte & Voorhees

[57] ABSTRACT

A tool bar includes a plurality of spaced apart ground working assemblies each of which includes a downwardly extending shank having a shovel on its lower end with rearwardly and outwardly extending mold boards. Adjustment of the mold boards is accomplished by forward ends being vertically and horizontally pivotally connected to the shank and an inverted laterally and longitudinally extendable T-shaped member connecting the rear ends of the mold boards to the shank above the forward connection of the mold boards to the shank. The mast of the T-shaped member is telescopically extendable and spaced apart sleeves are provided on the rear end with a bolt having oppositely threaded ends being positioned in the sleeves. A nut is positioned between the sleeves integrally on the bolt which engages threaded tubes positioned in the sleeves in turn engaging the outer ends of the mold boards at their outer ends.

5 Claims, 6 Drawing Figures

PATENTED MAR 11 1975 3,870,108
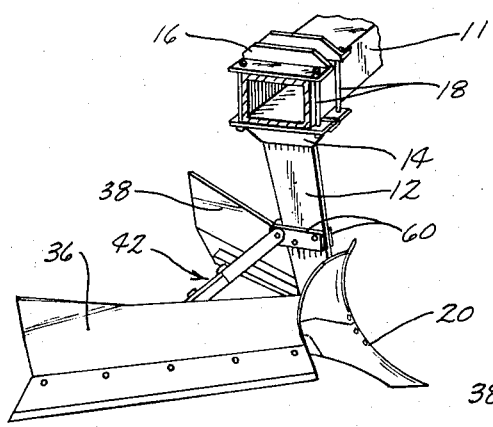
Fig. 1
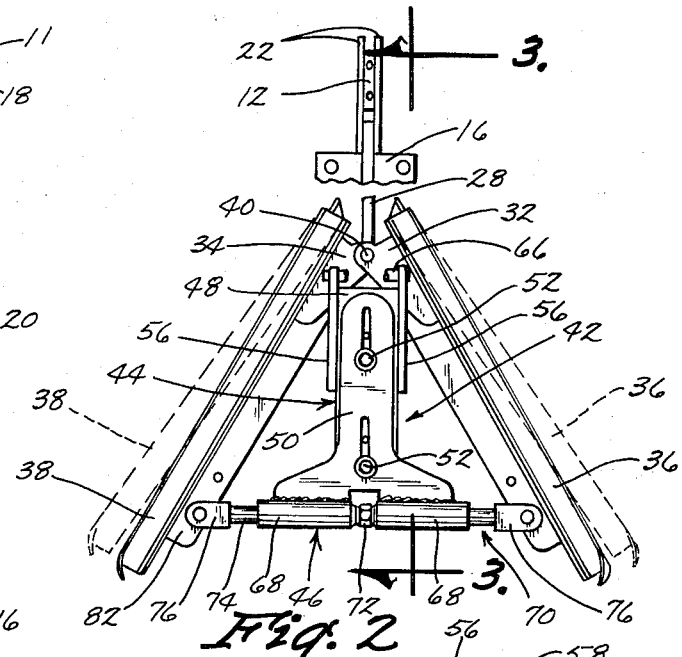
Fig. 2
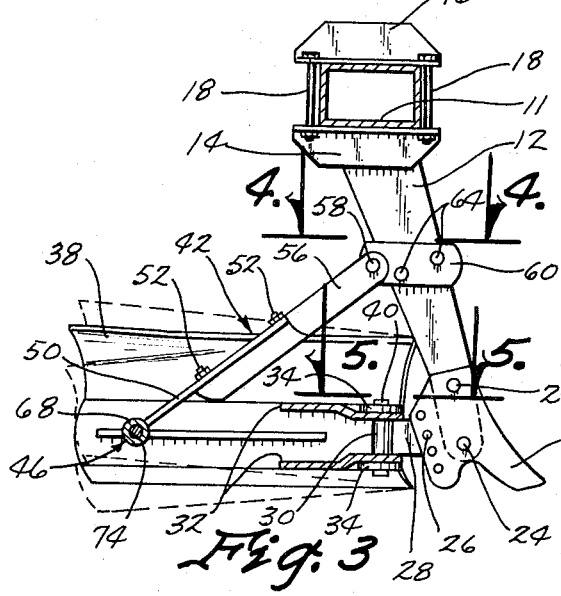
Fig. 3
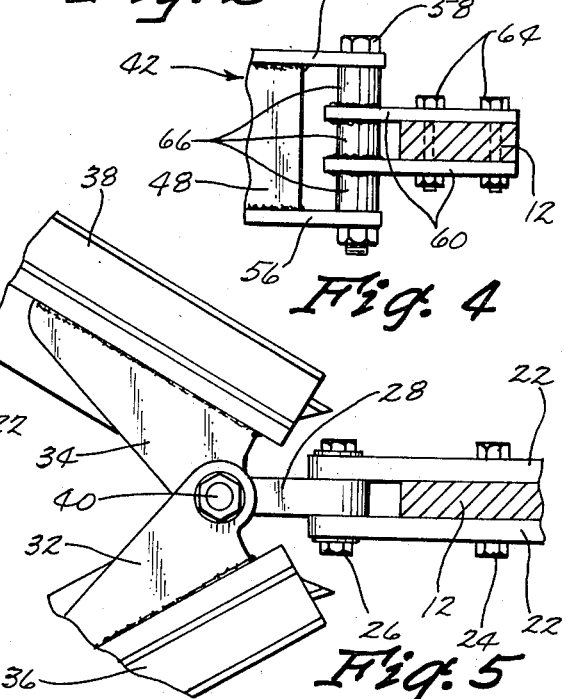
Fig. 4
Fig. 5
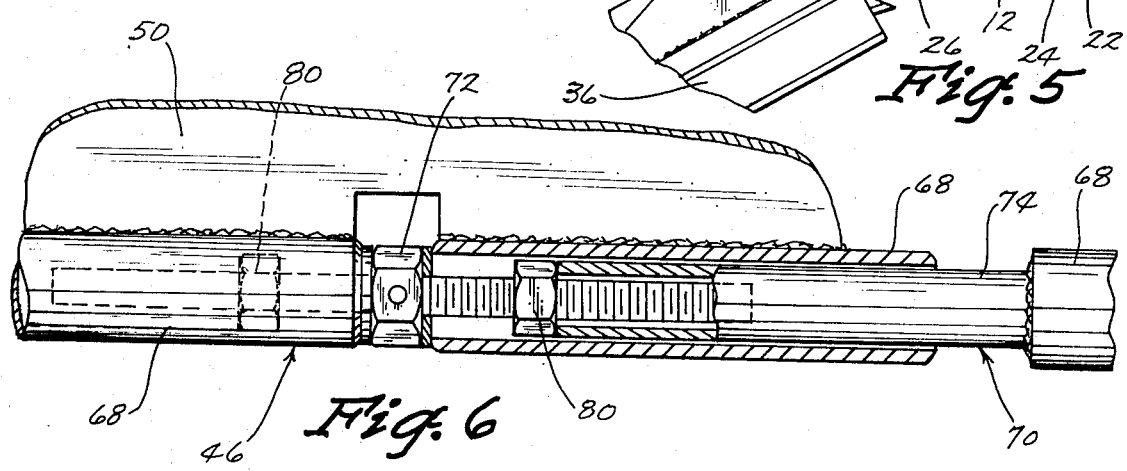
Fig. 6

SEEDBED SPLITTER AND SHAPER

The typical ground preparation for planting of corn involves use of a conventional plow followed by disking, harrowing and planting. A generally level bed surface is used. In areas where irrigation is necessary it has been found that the seedbed splitter and shaper of this invention provides a more preferred and suitable seedbed which includes an irrigation trough or valley below a ledge for planting seed which in turn is below a ridge of turned over crop from the previous season. The next season the seedbed sequence is reversed such that a ridge is formed in the valley and a valley is formed in place of each of the ridges with the seed being planted between the valley and the ridges. First, a bed splitter is passed over the soil after the cornstalks have been chopped by a cornstalk chopper or the like and then this is followed by the same seedbed preparation machine which functions then as a seedbed shaper in final preparation for the planting of the seed. The seedbed shaper differs from the seedbed splitter by the rearwardly and outwardly extending mold boards on opposite sides of the furrowing shovel being located lower on the splitter than on the shaper.

This invention is directed to the specific structure making the seedbed splitter and shaper readily adjustable as is required for use in multiple farming operations. Quick adjustment is possible due to the fact that a minimum number of adjustments is required. The mold boards are horizontally and vertically pivotally connected to the lower end of the shank extending from the tool bar while an inverted T-shaped member extends downwardly and rearwardly from the shank for connection with the rear ends of the mold boards. The mast of the T-shaped member is telescopically extendable, as well as the cross being readily extendable for the lateral adjustment of the mold boards. Spaced apart sleeves are provided on the rear end of the mast and a bolt having oppositely threaded ends is positioned in the sleeves. A nut is placed between the sleeves integral with the bolts and threaded tubes are connected at their outer ends to the outer ends of the mold boards and to the opposite ends of the bolts at their inner ends inside their sleeves. Turning of the nut thereby moves the mold boards inwardly and outwardly as desired. The forward ends of the mold boards include spaced apart apertured ears which embrace a sleeve through which a bolt extends to connect the forward ends of the mold boards to a link vertically adjustably connected to the lower end of the shank. Thus it is seen all the necessary adjustments for the mold boards are provided and may be readily performed as required.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a fragmentary perspective view of the mold board assembly connected to a tool bar.

FIG. 2 is a fragmentary top plan view showing the mold boards in multiple positions of adjustment.

FIG. 3 is a cross sectional view taken along line 3—3 in FIG. 2.

FIG. 4 is a cross sectional view taken along 4—4 in FIG. 3.

FIG. 5 is a cross sectional view taken along line 5—5 in FIG. 3.

FIG. 6 is an enlarged fragmentary view of the cross on the T-shaped member for providing lateral adjustment to the mold boards.

The seedbed splitter and shaper of this invention is referred to in FIG. 1 generally by reference to numeral 10 and is shown mounted on a tool bar 11. A downwardly extending shank 12 includes upper mounting plates 14 for engagement with the lower side of the tool bar 12 while mounting plates 16 are provided on the upper side with bolts 18 locking plates 14 and 16 together to secure the seedbed splitter and shaper assembly to the tool bar 12.

The lower end of the shank 12 is provided with a shovel 20 and includes a pair of shoe plates 22 connected to the shank 12 by vertically spaced apart bolts 24. A plurality of vertically spaced apart openings 26 are provided on the rear portions of the shoe plates 22 for selectively vertically positioning a link 28 having a sleeve 30 on its rearward end. Sleeve 30 is positioned between upper and lower ears 32 and 34 on the forward ends of mold boards 36 and 38. A bolt 40 extends through apertures in the ears and through the sleeve 30 to connect the forward ends of the mold boards to the shoe plates 22 which in turn connect the mold boards to the shank 12. This connection as seen provides both vertical and horizontal pivotal movement for the forward ends of the mold boards.

An inverted T-shaped member 42 includes a telescopically extendable mast portion 44 and a cross portion 46. The mast portion 44 includes extendable plates 48 and 50 interconnected by adjustable bolts 52. The forward end of the mast 44 is provided with apertured side plates 56 through which a bolt 58 extends for pivotally connecting the mast to a pair of plates 60 connected to the shank 12 by bolts 64. Spacers 66 are provided integrally on opposite sides and between the plates 60 to form a sleeve through which the bolt 58 extends. The lower and rear end of the mast 44 includes a pair of spaced apart sleeves 68 through which a bolt 70 having opposite threads on its opposite ends is positioned. A nut 72 is integral with the bolt 70 and is positioned between the sleeves 68. A pair of tubes 74 having clevises 76 at their outer ends for connection to mold boards are positioned in the sleeve 68 and threadably engage the oppositely threaded bolt ends through threaded integral nuts 80. The clevises 76 are connected to horizontally disposed inwardly extending plate members 82 on the mold boards.

Thus it is seen that in operation the horizontal positioning of the mold boards 38 is easily accomplished by selection of the appropriate vertically spaced apart openings 26 on the shoe plates 22. The rearward ends of the mold boards may be selectively elevated by adjustment of the bolts 52 in the inverted T-shaped member 42 as seen by the dash lines in FIG. 3. Lateral adjustment of the mold boards is seen in FIG. 2 by adjustment of the nut 72 which operates the turnbuckle arrangement connecting the outer ends of the mold boards to the T-shaped member 42.

I claim:

1. A ground working implement comprising,
   a tool bar,
   a shank having upper and lower ends,
   said shank connected at its upper end to said tool bar and extending downwardly therefrom,
   a shovel on the lower end of said shank, a pair of mold boards having rearward and forward ends, said pair of mold boards vertically and horizontally pivotally connected at their forward ends to said shank and extending rearwardly and outwardly therefrom, an inverted laterally and longitudinally extendable T-shaped member having a cross and a mast, said cross having opposite ends, said mast having a free end, the opposite ends of said cross being pivotally connected to the rear ends of said mold boards and the free end of said mast being pivotally connected to said shank above the connection of the mold boards to said shank, means for selectively vertically adjustably connecting the forward ends of said mold boards to said shank whereby said mold boards may be moved vertically with respect to said shank.

2. The structure of claim 1 wherein a bolt means pivotally connects the forward ends of said mold boards about a vertical axis, a link secured to said bolt means and extending forwardly therefrom, means for adjustably vertically and pivotally securing the forward end of said link to said shank.

3. The structure of claim 1 wherein said T-shaped member is further defined as including telescopic plates forming said mast.

4. A ground working implement comprising, a tool bar, a shank having upper and lower ends, said shank connected at its upper end to said tool bar and extending downwardly therefrom, a shovel on the lower end of said shank, a pair of mold boards having rearward and forward ends, said pair of mold boards vertically and horizontally pivotally connected at their forward ends to said shank and extending rearwardly and outwardly therefrom, an inverted laterally and longitudinally extendable T-shaped member having a cross and a mast, said cross having opposite ends, said mast having a free end, the opposite ends of said cross being pivotally connected to the rear ends of said mold boards and the free end of said mast being pivotally connected to said shank above the connection of the mold boards to said shank, said T-shaped member being further defined as including telescopic plates forming said mast, said cross on said T-shaped member including a turnbuckle for lateral adjustment of said cross length, said cross also including a pair of spaced apart sleeves, a bolt having opposite threads on its ends is positioned in said sleeves, a nut is integral with said bolt and positioned between said sleeves, a pair of threaded tubes engage opposite ends of said bolt and are positioned in said sleeves with the outer free ends of said threaded tubes being connected to said mold boards at their outer ends whereby turning of said nut causes said mold boards to be moved laterally inwardly or outwardly.

5. A ground working implement comprising, a tool bar, a shank having upper and lower ends, said shank connected at its upper end to said tool bar and extending downwardly therefrom, a shovel on the lower end of said shank, a pair of mold boards having rearward and forward ends, said pair of mold boards vertically and horizontally pivotally connected at their forward ends to said shank and extending rearwardly and outwardly therefrom, an inverted laterally and longitudinally extendable T-shaped member having a cross and a mast, said cross having opposite ends, said mast having a free end, the opposite ends of said cross being pivotally connected to the rear ends of said mold boards and the free end of said mast being pivotally connected to said shank above the connection of the mold boards to said shank, said shank also including a pair of shoe plates and a link being vertically pivotally connected between said plates and includes a vertically disposed sleeve at its rear end, the forward end of each of said mold boards includes spaced apart, aligned apertured ears positioned with said sleeve therebetween and a bolt extending through said apertured ears and said sleeve to provide lateral mold board pivotal movement.

* * * * *